Nov. 19, 1957  R. H. MILLER  2,813,420
DIAL GAUGES

Filed Sept. 26, 1955  2 Sheets-Sheet 1

INVENTOR
BY
ATTORNEY

Nov. 19, 1957  R. H. MILLER  2,813,420
DIAL GAUGES
Filed Sept. 26, 1955  2 Sheets-Sheet 2
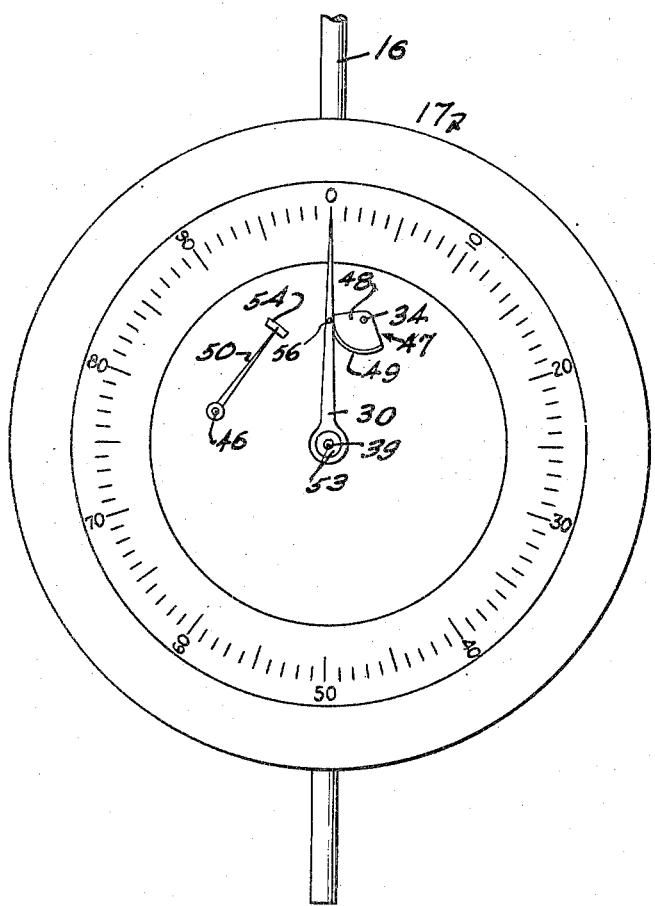
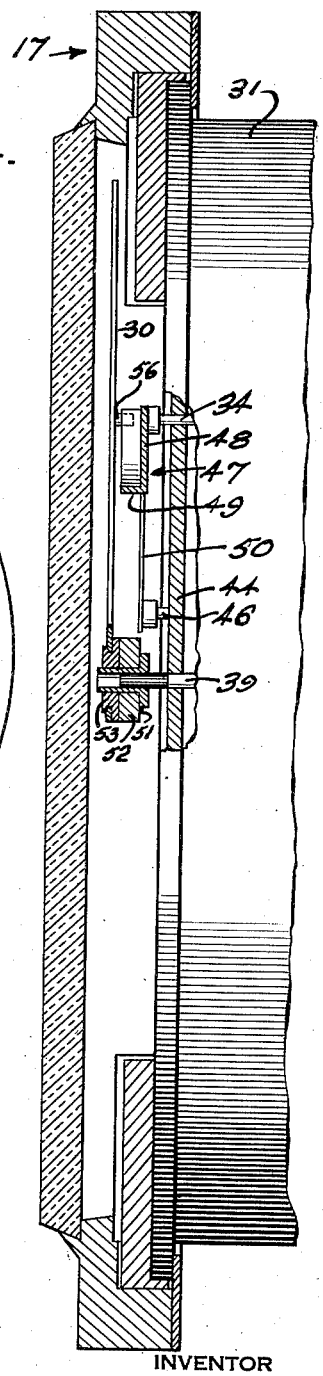
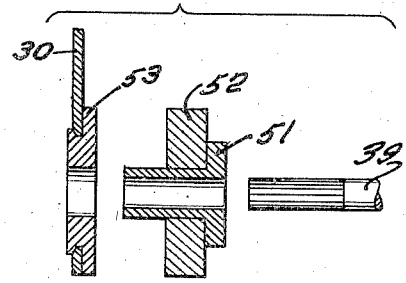
INVENTOR
BY
*James T Bethell*
ATTORNEY

United States Patent Office 2,813,420
Patented Nov. 19, 1957

2,813,420
DIAL GAUGES

Raymond H. Miller, Cranston, R. I., assignor to Federal Products Corporation, a corporation of Rhode Island Application September 26, 1955, Serial No. 536,567

7 Claims. (Cl. 73—83)

This invention relates to dial gauges.

An important use of dial gauges is the measurement of the distance between two (or more) surfaces by the engagement of the moveable spindle with first one surface and then the other, the piece being measured and the dial gauge being suitably supported. The dial reading when the spindle contacts one surface can be subtracted from the reading when the spindle contacts the other, to give the required distance. In order to obviate the mental process of subtraction, the gauge sometimes has a rotatable dial, which is set at zero by hand while the first surface is engaged. The distance to the second surface is then indicated directly on the dial when that surface is engaged by the spindle.

Some gauging and inspection operations may involve a thousand or more repetitions of the above operation on similar pieces in a day, and a considerable portion of the gauging time is spent on merely setting the dial. It can be seen that a considerable portion of the gauging expense can be saved by merely eliminating the necessity of initially zeroing the dial. Forgetfulness of the operator in neglecting to set the dial can also be eliminated as a factor to be contended with.

Another example is the performance of the Rockwell penetration test for hardness of materials. The principle of that test is the preliminary indentation of the material by the pressure of the indenter therein, under a definite load, called the minor load, and the measurement of the distance the penetrator thereafter sinks into the material, under the application of a larger load, called the major load. In practice, the minor load is applied, a dial gauge, connected to the penetrator is then set at zero manually, and the major load applied and removed. The movement of the penetrator into the test object under the major load will then be indicated on the dial. This dial reading (and a letter, depending on the load, type of penetrator, etc.) is reported as the Rockwell hardness.

For various reasons the usual machine for Rockwell testing employs a spring for applying the minor load, and a weight for applying the major load. To apply the minor load, the operator elevated the object being tested, which raises the penetrator and compresses a spring. The movement of the penetrator causes the pointer of the dial gauge to rotate about two and a half turns. If the raising of the object is stopped when the pointer of the dial gauge is within 35° of vertical position, the minor load is properly applied. The operator then turns the dial until its set point is exactly opposite the pointer, and applies and removes the major load. Sinking of the penetrator causes the pointer to revolve in the opposite direction to that of rotation as the minor load is applied. The rotation under the major load is sometimes more than one revolution. The number at which the pointer comes to rest is part of the reported Rockwell hardness.

It would be most desirable to be able to eliminate the setting of the gauge dial as a step in the performance of the Rockwell test. However, the construction and mode of operation of the Rockwell tester require that the pointer be capable of travelling past the "set" point in one direction or the other in different stages of operation of the machine.

With the above considerations in mind, it is a primary purpose of the present invention to provide a dial gauge which automatically positions the pointer at a fixed point upon motion of the spindle of the gauge in one direction, and permits motion of the pointer around the dial upon subsequent motion of the spindle in the opposite direction.

It is a further object of the present invention to provide a dial gauge with an automatic pointer setting mechanism which permits at least one turn of the pointer hand in either direction from the reference point.

It is a further object of this invention to provide a tester of the Rockwell type with an automatic gauge eliminating the present operation of setting the dial after the application of the minor load.

Referring now to the drawings:

Fig. 3 is a front view of the dial gauge of Fig. 2;

Fig. 4 is an enlarged, fragmentary section of the dial gauge shown in Fig. 3; and, Fig. 5 is an exploded, enlarged view of a portion of the dial gauge shown in the other views.

Figure 1:
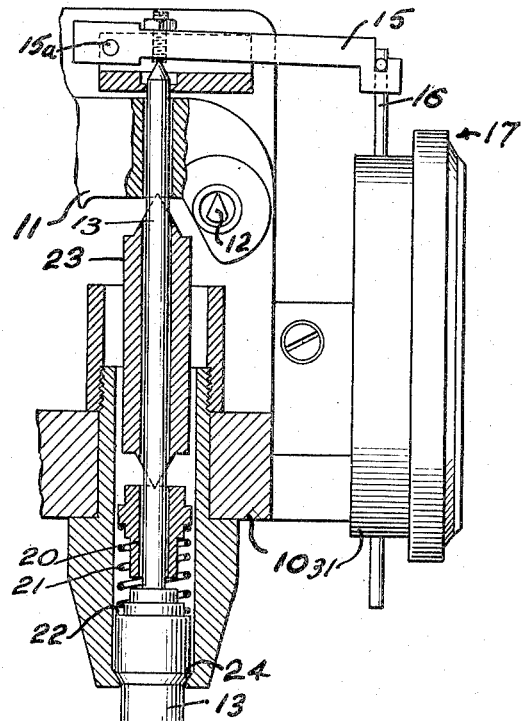
Fig. 1 is a view, partly in section, of a part of a machine for performing the Rockwell test.

For the purpose of illustrating a specific application of the gauge embodying the present invention, there are shown in Fig. 1 certain parts of a machine for Rockwell testing, with the parts operating the gauge shown. A frame member 10 supports an arm 11, so that it may pivot about a knife edge 12 engaging plates on the frame. This arm is held against downward pivotal movement by suitable mechanism not shown. It is held against upward movement by the major load, which is a dead weight suspended from the end opposite the knife edge. A plunger 13, having its lower end furnished with a penetrator 14, is mounted for vertical movement with respect to the frame 10. A lever 15 is pivoted to the frame at 15a and engaged intermediate its ends by the top of the plunger 13. At the end opposite the pivotal connection between the frame and lever, a spindle or rack 16 of a dial gauge 17 is connected to the lever 15. Thus vertical movement of the plunger is accompanied by a corresponding movement of the spindle of the dial gauge.

In the conventional machine for Rockwell testing, a bushing 20 is mounted to slide along the plunger rod 13, and a spring 21 is positioned between the bushing 20 and a shoulder 22 on the plunger 13. Upward movement of the bushing 20 is restrained by a knife edge plunger 23, which engages the lower side of the arm 11 and a notch in the bushing 20. Downward movement of the plunger rod 13 when the machine is idle is restrained by a suitable seat, as for example, the conical seat 24. In operation, a test object is placed on an anvil which is mounted on an elevating screw. By turning a capstan, the object is raised into contact with the tip of the penetrator. Further elevation raises the penetrator and the plunger rod 13 against the resistance of spring 21, and such movement of the plunger 13 is indicated on the face of the dial gauge by motion of its pointer around the dial.

The movement of the pointer is utilized to indicate that the minor load, determined by the degree of compression of spring 21, is properly applied. Referring to Fig. 3, the minor load is properly applied when, turning clockwise, the large pointer 30 passes the zero twice and stops anywhere between the graduations marked 90 and 10 the next time around. In the conventional machine, after the pointer has stopped as specified above, the graduations of the dial are then rotated by hand to bring the zero opposite the pointer. The major load is then applied and removed. Such application of the load causes arm 11 to pivot downwardly around knife edge 12, and as a result the knife edge plunger 23 forces the plunger rod 13, through the bushing 20, downwardly, the penetrator entering the test object and the frame of the machine springing somewhat. This causes the pointer to travel counterclockwise, sometimes for more than one revolution. Removal of the major load removes the spring of the frame and the pointer travels to a position which is determined by the final penetration of the penetrator in the test object. As the dial was set at zero before application of the major load, obviously the final reading is a number directly proportional to the increment of penetration caused by the major load. It might be mentioned that in the case of soft brass, with a proper penetrator, the pointer may come to rest after more than a complete counterclockwise turn during application of the major load, somewhere between zero and 70 on the scale shown in the drawing. Arbitrarily numbered scales take care of the reading of the hardness number in this event, but it can be seen that in addition to the requirement that the pointer be automatically set at zero after passing it in a clockwise direction, it must also be free to turn counterclockwise past the zero during testing; i. e., it must follow the motion of the plunger rod to that extent.

Figure 2:
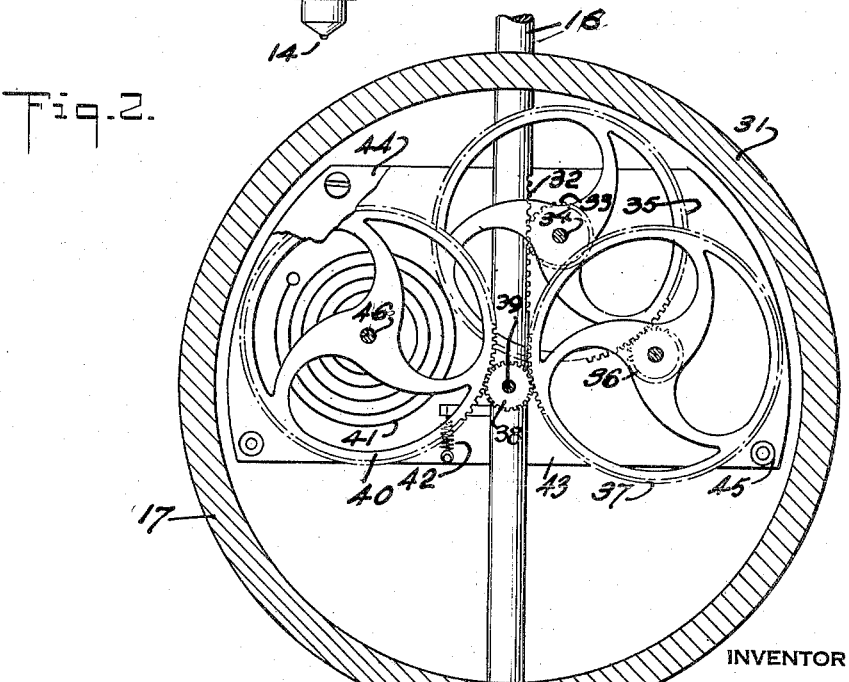
Fig. 2 is a section, parallel to the face thereof of a preferred form of dial gauge.

Referring now to Figs. 2, 3, and 4, a dial gauge embodying the present invention is shown. A case 31 is provided with suitable bearings for sliding movement of the spindle 16, which spindle may be prevented from rotating by any suitable means. A rack 32 is formed on one side of the spindle for actuating a gear train. The gear train comprises a pinion 33 in mesh with the rack, mounted on a shaft 34 with gear 35, which in turn meshes with a pinion 36. Pinion 36 and gear 37 are fast to a common shaft, and gear 37 meshes with pinion 38. The shaft 39 of the pinion 38 is the shaft which carries the pointer of the dial gauge.

A second gear 40 is in mesh with the pinion 38, and is provided with a hair spring 41, for the purpose of biasing the gear train in one direction, thus eliminating the effect of play between the teeth of the various elements of the train. Also, a spring 42 may be utilized to return the stem to one end of its travel when no moving force is applied to it.

The entire gear train is mounted between two plates, a back plate 43 and a front plate 44, held in spaced relation by pillars 45. Shaft 46, to which gear 40 is secured, shaft 34 and of course shaft 39 extend through the front plate and through the dial for purposes to be described. It might be mentioned that as the spindle 16 passes directly through the center axis of the circular case, which is also the axis of the shaft 39, it is convenient to mount shaft 39 and pinion 38 between a bearing on the front plate 44 and an outboard bearing secured to the back of that front plate.

Referring now more particularly to Figs. 3, 4, and 5, the dial is shown as provided with a series of graduations, which are fixed relative to the case, and not rotatable. A cylindrical sector 47 is secured to shaft 34. This sector is in the form of a flat plate portion 48 with a cylindrical flange 49, which flange has its axis coincident with the axis of shaft 34. This sector is immovable on shaft 34 during operation of the device, and thus takes a position dependent upon the absolute position of the spindle 16 relative to the case 31.

On shaft 46 there is secured a relatively short pointer 50. Because of its gearing, it rotates only a fraction of a revolution for each turn of the shaft 39 and pointer 30. In ordinary usage, it can be utilized to count revolutions of the main pointer. In the particular application in a machine for Rockwell testing, however, its counting function is not so apparent.

Pointer 30 is secured to the shaft 39 to turn with it, but at the same time is capable of movement with respect to the shaft. Any overriding clutch mechanism would serve, provided it could be made light and small enough, as for instance, a mechanism employing spring pressed friction plates. For ease of construction and reliability, however, the clutch shown has definite advantages. A bushing 51 is mounted on the shaft 39 with a press fit, and in turn has immovably mounted on it a small magnet 52, preferably of a material capable of retaining a high degree of magnetism. The pointer 30 is made of light, strong material, such as aluminum or magnesium, and is secured to a bushing 53 of magnetic material. The bore of the bushing 53 is an easy turning fit over the bushing 51, and thus the pointer is readily turned about its axis except for the restraint of the friction between bushing 53 and the magnet 52 engendered by the attraction between bushing 53 and the magnet 52.

For Rockwell testing, the dial is provided with a marker 54 in the path of pointer 50. The marker 54 is of such a size and in such a position that when spring 21 is compressed the proper amount (within the range permitted in the Rockwell test) the end of pointer 50 will be opposite some portion of the marker 54. It is easy to elevate the test object by turning the capstan on the machine so as to cause the pointer 50 to stop somewhere on the marker 54.

When the pointer 50 is opposite any portion of the marker 54, the pointer 30 is intended to be exactly opposite the zero. To this end, the sector 47 is placed on the shaft 34 in such a position that previous to the arrival of pointer 50 at the marker during counterclockwise rotation of pointer 50 and previous to the arrival of pointer 30 at zero during clockwise rotation, both engendered by the raising of the stem 16, the left hand end of the flange 49 moves into the path of a pin 56 on pointer 30. The pin thus strikes the sector flange and the pointer 30 ceases rotating, while the spindle 16 continues to rise, until the operator ceases to turn the capstan as he observes that pointer 50 is in proper relation to marker 54.

The machine is now ready for application of the major load, as the pointer 30 is on zero, and a proper minor load has been applied. When the major load is applied, the large pointer 30 travels around the dial in a counterclockwise direction, and may pass the zero. Accordingly, the right hand end of flange 49 must be limited in extent so that the pin 56 does not engage it as the pointer 30 passes zero for the first time after application of the major load.

However, as engagement of the pin 56 with the left hand portion of the sector flange during clockwise rotation of the pointer shaft 39 causes slippage of the pointer 30 relative to the shaft 39, it is obvious that the pointer must be moved back relative to the shaft 39 after each use of the instrument, if the pointer is to reach zero before pointer 50 arrives at the marker 54. To this end, the right hand portion of flange 49 is made to extend into the path of the pin 56 as the pointer 30 travels in a counterclockwise direction near the bottom of the travel of plunger 13 as the test object is lowered for removal.

Shaft 39 turns two and one half revolutions clockwise as the penetrator is raised by the test object in applying the minor load. It turns two and one half revolutions from minor load applied position during testing and removal of the test object by lowering, this revolution being counterclockwise. As the sector piece 47 permits the pin 56 of pointer 30 to pass it once during clockwise motion of the shaft 39 for two and one half revolutions, but restrains it from movement for the last half revolution, and likewise, during counterclockwise revolution of the pointer 30 the sector piece must engage the pin 56 for at least the last half revolution of the shaft 39, it is obvious that the pointer 30 is bound to slip at the end of its travel in either direction, and thus always reaches the flange 49, when travelling clockwise, before the pointer 50 reaches the marker 54.

It will be understood that although the illustrated device has a gear ratio and size of sector 47 suitable for use in a Rockwell test, the number of turns which the hand 30 can make without striking of the pin 56 on the sector can be varied at will in accordance with the requirements of any gaging application to which the device is adapted to be applied.

I claim:

1. A dial gauge including a movable element adapted to be moved by forces external of the dial gauge, a shaft, means positively connecting the shaft to the movable element for rotation in response to movement of said element, a pointer, a gear train and overriding clutch means between the movable element and the pointer driving the pointer in response to movement of the movable element, stop means arresting the movement of the pointer at a predetermined position of the pointer when the stop means is in operative position, the clutch means then permitting continued motion of the movable element during arrest of the pointer, and means connecting the stop means to the shaft for motion into and out of operative position in response to rotation of the shaft.

2. A dial gauge including a movable element adapted to be moved by forces external of the dial gauge, a shaft, means positively connecting the shaft to the movable element for rotation in response to movement of the movable element, a pointer, a gear train and overriding clutch means between the movable element and the pointer driving the pointer in response to movement of the movable element, stop means arresting the movement of the pointer when the stop means is in operative position, said clutch means then permitting continued motion of the movable element during arrest of the pointer, means connecting the stop means to said shaft moving the stop means into operative position when the movable element is in either of two positions, and out of operative position when the movable element is intermediate said two positions.

3. A dial gauge including a movable element adapted to be moved by forces external of the dial gauge, a shaft, means positively connecting the shaft to the movable element for rotation in response to movement of the movable element, a pointer, a pointer shaft, a gear train connecting the pointer shaft to the movable element for rotation in response to movement of the movable element, overriding clutch means connecting the pointer to the pointer shaft, stop means on the first-mentioned shaft interposed in the path of the pointer in either of two positions of the shaft and out of such interposition in positions of the shaft intermediate said two positions.

4. A dial gauge including a movable element adapted to be moved by forces external of the dial gauge, a shaft, means positively connecting the shaft to the movable element for rotation in response to movement of the movable element, a pointer, a pointer shaft, a gear train connecting the pointer shaft to the movable element for rotation in response to movement of the movable element, overriding clutch means connecting the pointer to the pointer shaft, a sector on the first mentioned shaft interposed in the path of the pointer in two positions of the movable element and out of interposition in positions of the movable element intermediate the said two positions.

5. A dial gage including a movable element adapted to be moved by forces external of the dial gauge, a shaft, means positively connecting the shaft to the movable element for rotation in response to movement of said element, a pointer, means positively connecting said pointer to the movable element for motion in response to movement of said element, a second pointer, a gear train and overriding clutch means between the movable element and the second pointer driving the second pointer in response to movement of the movable element, stop means arresting the movement of the second pointer at a predetermined position of the second pointer when the stop means is in operative position, the clutch means then permitting continued motion of the movable element and the first pointer during arrest of the second pointer, and means connecting the stop means to the shaft for motion into and out of operative position in response to rotation of the shaft.

6. In a machine for Rockwell testing, means adapted to elevate a test object, a penetrator adapted to bear against and be raised by a test object upon such elevation to compress a spring and thus apply a minor load, a dial gauge, a minor load pointer on the dial gauge, means connecting the minor load pointer to the penetrator for movement in response to motion of the penetrator, a hardness pointer on the dial gauge, means including an overriding clutch connecting said hardness pointer to the penetrator for movement in response to movement thereof, stop means arresting motion of the hardness pointer when in operative position, a shaft, means connecting said shaft to the penetrator for rotation in response to movement of the penetrator, and means connecting the shaft to the stop means moving the stop means into operative position in either of two positions of the penetrator and shaft, and out of operative position in intermediate positions of the penetrator and shaft.

7. In a machine for Rockwell testing, means adapted to elevate a test object, a penetrator adapted to bear against and be raised by a test object upon such elevation to compress a spring and thus apply a minor load, a dial gauge, a minor load pointer on the dial gauge, means connecting the minor load pointer to the penetrator for movement in response to motion of the penetrator, indicia on the dial gauge cooperating with the minor load pointer and indicating the extremes of the range of positions of the penetrator in which the minor load is properly applied, a hardness pointer on the dial gauge, means including an overriding clutch connecting said hardness pointer to the penetrator for movement in response to movement thereof, stop means arresting motion of the hardness pointer at a predetermined position when in operative position, a shaft, means connecting the shaft to the penetrator for rotation in response to motion of the penetrator, and means connecting the shaft to the stop means moving the stop means into operative position when the penetrator is approaching the range of positions in which the minor load is applied and maintaining said stop means in such operative position throughout the entire range of positions of the penetrator in which the minor load is properly applied.

References Cited in the file of this patent

UNITED STATES PATENTS

| 1,476,904 | Malmquist | Dec. 11, 1923 |
| 1,885,972 | Wilson | Nov. 1, 1932 |
| 2,258,424 | Smith | Oct. 7, 1941 |

FOREIGN PATENTS

| 700,521 | Germany | Dec. 21, 1940 |
| 586,143 | Great Britain | Mar. 7, 1947 |